United States Patent
Kamiguchi et al.

(10) Patent No.: US 6,527,534 B1
(45) Date of Patent: Mar. 4, 2003

(54) EJECTOR CONTROLLER OF INJECTION MOLDING MACHINE

(75) Inventors: Masao Kamiguchi, Yamanashi (JP); Tatsuhiro Uchiyama, Yamanashi (JP); Minoru Kobayashi, Yamanashi (JP); Masayuki Ueno, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 48 days.

(21) Appl. No.: 09/626,962

(22) Filed: Jul. 27, 2000

(30) Foreign Application Priority Data

Jul. 28, 1999 (JP) .......................................... 11-213567

(51) Int. Cl.[7] .............................................. B29C 45/76
(52) U.S. Cl. ...................... 425/139; 425/173; 425/556
(58) Field of Search .................. 425/139, 173, 425/444, 556; 264/334; 318/434, 565, 566

(56) References Cited

U.S. PATENT DOCUMENTS

| | | | |
|---|---|---|---|
| 5,469,038 A | * 11/1995 | Silvey | 318/632 |
| 5,470,218 A | * 11/1995 | Hillman et al. | 264/40.6 |
| 5,719,479 A | 2/1998 | Kato et al. | |
| 5,734,242 A | 3/1998 | Iwashita | 318/434 |

FOREIGN PATENT DOCUMENTS

| | | | |
|---|---|---|---|
| EP | 0656250 A1 | 6/1995 | |
| EP | 1020279 A1 | 7/2000 | |
| EP | 1 072 388 | 1/2001 | |
| JP | 10119107 A | 5/1998 | B29C/45/84 |

OTHER PUBLICATIONS

Patent Abstracts of Japan, vol. 013, No. 582, Dec. 21, 1989 And JP 01 244816 A (Japan Steel Works Ltd.) Sep. 29, 1989 Abstract.

Patent Abstracts of Japan, vol. 011, No. 263, Aug. 26, 1987 And JP 62 066917 A (Toshiba Mach Co. Ltd.) Mar. 26, 1987 Abstract.

Patent Abstracts of Japan, vol. 010, No. 045, Feb. 21, 1986 And JP 60 190829 A (Sumitomo Jukikai Kogyo KK), Sep. 28, 1985 Abstract.

Patent Abstracts of Japan, vol. 010, No. 234, Aug. 14, 1986 And JP 61 066621 A (Sumitomo Heavy Ind. Ltd.), Apr. 5, 1986 Abstract.

Patent Abstracts of Japan, vol. 012, No. 197, Jun. 8, 1988 And JP 63 003925 A, (Fanuc Ltd.), Jan. 8, 1988 Abstract.

Examination Report for European Application No. 00 306 442.5–1253, Sep. 17, 2002.

* cited by examiner

*Primary Examiner*—Jan H. Silbaugh
*Assistant Examiner*—Donald Heckenberg
(74) *Attorney, Agent, or Firm*—Staas & Halsey, LLP

(57) ABSTRACT

A disturbance estimating observer is provided, which estimates a load applied to a servomotor for driving an ejector axis. When an ejector operates, the disturbance load torque estimated by the observer is sampled for each specific period (0 to j), and the data DA (0, 0) to DA (i, j) of (i+1) ejector processes are stored in a table TA in the form of cyclic storage. From this table TA, average values DB (0) to DB (j) of estimated disturbance load torques are determined in turn and they are stored in a table TB. From these average values, upper limit values DC (0) to DC (j) and lower limit values DD (0) to DD (j) of a permissible range are stored in tables TC, TD. When the determined estimated disturbance load torque has exceeded the permissible range, an abnormal load signal is outputted.

16 Claims, 5 Drawing Sheets

| | 0 | 1 | ... | a | ... | i |
|---|---|---|---|---|---|---|
| 0 | DA(0,0) | DA(1,0) | ... | DA(a,0) | ... | DA(i,0) |
| 1 | DA(0,1) | DA(1,1) | ... | DA(a,1) | ... | DA(i,1) |
| 2 | DA(0,2) | DA(1,2) | ... | DA(a,2) | ... | DA(i,2) |
| . | . | . | ... | . | ... | . |
| n | DA(0,n) | DA(1,n) | ... | DA(a,n) | ... | DA(i,n) |
| . | . | . | ... | . | ... | . |
| j | DA(0,j) | DA(1,j) | ... | DA(a,j) | ... | DA(i,j) |

TB

| | B |
|---|---|
| 0 | DB(0) |
| 1 | DB(1) |
| 2 | DB(2) |
| . | . |
| n | DB(n) |
| . | . |
| j | DB(j) |

TC

| | C |
|---|---|
| 0 | DC(0) |
| 1 | DC(1) |
| 2 | DC(2) |
| . | . |
| n | DC(n) |
| . | . |
| j | DC(j) |

TD

| | D |
|---|---|
| 0 | DD(0) |
| 1 | DD(1) |
| 2 | DD(2) |
| . | . |
| n | DD(n) |
| . | . |
| j | DD(j) |

TE

| | E |
|---|---|
| 0 | DE(0) |
| 1 | DE(1) |
| 2 | DE(2) |
| . | . |
| n | DE(n) |
| . | . |
| j | DE(j) |

…

EJECTOR CONTROLLER OF INJECTION MOLDING MACHINE

BACKGROUND OF THE INVENTION

1. Field of the Invention

The present invention relates to an ejector controller of an injection molding machine, and more particularly relates to an ejector controller in which breakdown of a core of a die or the like is prevented by the ejector operation.

2. Description of the Prior Art

It has been performed to detect a load applied to an ejector pin, in order to prevent the ejector pin, a core of a die, or the like from being broken down because of making an error in setting the projecting amount of the ejector pin so that an abnormal load may be applied to the ejector pin, and further, in order to prevent an ejector pin, a core body, a core, or the like from being broken down because of causing an interference between the ejector pin and the core body or the like so that an abnormal load may be applied to the ejector pin or the core body, and furthermore, in order to detect the fact that a molded part is left in the die or the like.

Especially, in an electrically powered ejector mechanism in which an ejector mechanism is driven by a servomotor, the following procedures are disclosed in Japanese Patent Application Laid-Open No. 10-119107:

A disturbance estimating observer is assembled in a servo circuit of a servomotor for driving and controlling an ejector axis, and a disturbance load torque is estimated by the above described disturbance estimating observer, and this estimated disturbance load torque is compared with a set permissible value for each specific period, and a timer is started at the time when the estimated disturbance load torque exceeds the permissible set value, and in the case where disturbance load torque exceeding the set permissible value is continuously detected over the set permissible time, it is detected that a collision occurs between an ejector rod and another object, and an abnormal signal is issued to stop the ejector axis driving servomotor.

In the above described procedures in which the estimated disturbance load torque determined by the disturbance estimating observer is compared with the set permissible value to detect an abnormal load, it is necessary to set a permissible value. Since the permissible range of the load is different and also the frictional torque applied to the ejector rod is different depending on dies, the set permissible value for judging that a load is abnormal is also different depending on the die. Therefore, it is necessary to set a permissible value for judging this load abnormality each time the die is exchanged. When the maximum value within the optimum permissible range is not set as the permissible value and a set value larger than the maximum value of this permissible range is set, there is a possibility of breaking down the core of the die.

Furthermore, when a permissible value smaller than the maximum value within the per missible range is set, the disturbance load torque which changes according to the variation of the frictional force of an ejector plate or an ejector pin or the like in each ejector operation exceeds this set permissible value, and an alarm or the like is outputted for a load abnormality to stop the operation, in spite of a normal ejector operation, and consequently, the production efficiency is lowered.

Therefore, it is necessary to set the permissible value for judging an abnormal load at an optimum value for each die. However, as mentioned above, this permissible value changes depending on dies, and therefore, it is necessary for an operator who sets the permissible value to have knowledge and experience of dies. Furthermore, even when the operator has knowledge and experience thereof, it is very difficult to set the optimum permissible value.

OBJECTS AND SUMMARY OF THE INVENTION

It is an object of the present invention to provide an ejector controller of an injection molding machine in which it is unnecessary for the operator to set a value for judging an abnormal load from the estimated disturbance load torque and the value can automatically be set.

In the ejector controller of an injection molding machine according to the present invention, load detecting means for detecting a load applied to a servomotor which drives the ejector axis is assembled in the controller, and the load applied to the servomotor at the time of the ejector operation for each molding cycle is detected by means of the load detecting means. Then, the loads for the latest one or a plurality of ejector operations before the present molding cycle are stored in storing means with respect to the time or the ejector positions. Means for obtaining a reference load from the stored load, and means for determining a permissible upper limit value from the reference load are provided, and further, discriminating means for outputting an abnormal signal when the load at the time of the present ejector operation exceeds the above described permissible upper limit value is provided.

The ejector controller of an injection molding machine according to the present invention can employ the following embodiments:

When an abnormal signal is outputted, the load applied to the servomotor at the time of that ejector operation is excluded from the data for determining the reference load.

Any permissible upper limit value is set on the screen. Furthermore, the load applied to the servomotor at the time of the present ejector operation, the reference load and the permissible upper limit value, or a deviation between the reference load and the load at the time of the present ejector operation are graphically displayed on the screen with respect to the time or the ejector position.

A permissible lower limit value is also determined by the above described means for determining the permissible upper limit value from the reference load, and the above described discriminating means also outputs an abnormal signal when the load applied to the servomotor at the time of the present ejector operation exceeds the above described permissible lower limit value.

For a predetermined number of cycles after starting of a full automatic molding, the load applied to the servomotor is excluded from the data for determining the reference load. Furthermore, this predetermined number of cycles after starting of a full automatic molding for which the load applied to the servomotor is excluded from the data for determining the reference load is set on the screen of display means. The above reference load is determined by the average value of the loads applied to the servomotor at the time of the ejector operation in a plurality of molding cycles before the present molding cycle.

The above described detecting means for detecting a load applied to the servomotor is a disturbance estimating observer. The disturbance estimating observer estimates a load as a load torque.

According to the present invention, as for the permissible range for the discrimination of an abnormal load in the ejector operation, the reference disturbance load torque is automatically determined from the estimated disturbance load torques obtained at the time of a plurality of times of normal ejector operations just before the present molding cycle, and on the basis of this reference disturbance load torque, the discrimination of an abnormal load is performed, and therefore, it is unnecessary for the operator to set the reference value for the discrimination of an abnormal load. Furthermore, the reference disturbance load torque is determined on the basis of the data obtained in the normal ejector operation, and an abnormal load is discriminated by using the permissible range determined by this reference disturbance load torque, and therefore, the discrimination of an abnormal load is more accurately and optimally performed. Furthermore, the permissible range determined by the reference disturbance load torque is not a uniform value, but a waveform during an eject stroke, and therefore, it becomes an optimum permissible range corresponding to the position of the ejector pin, so that an abnormal load can be discriminated more accurately.

BRIEF DESCRIPTION OF THE DRAWINGS

The foregoing and other objects and features of the invention will become apparent from the following description of preferred embodiments of the invention with reference to the accompanying drawings, in which:

FIG. 4 is an explanation figure of a table provided in a data storing RAM in the above described embodiment.

DETAILED DESCRIPTION OF THE PREFERRED EMBODIMENTS

Figure 1:
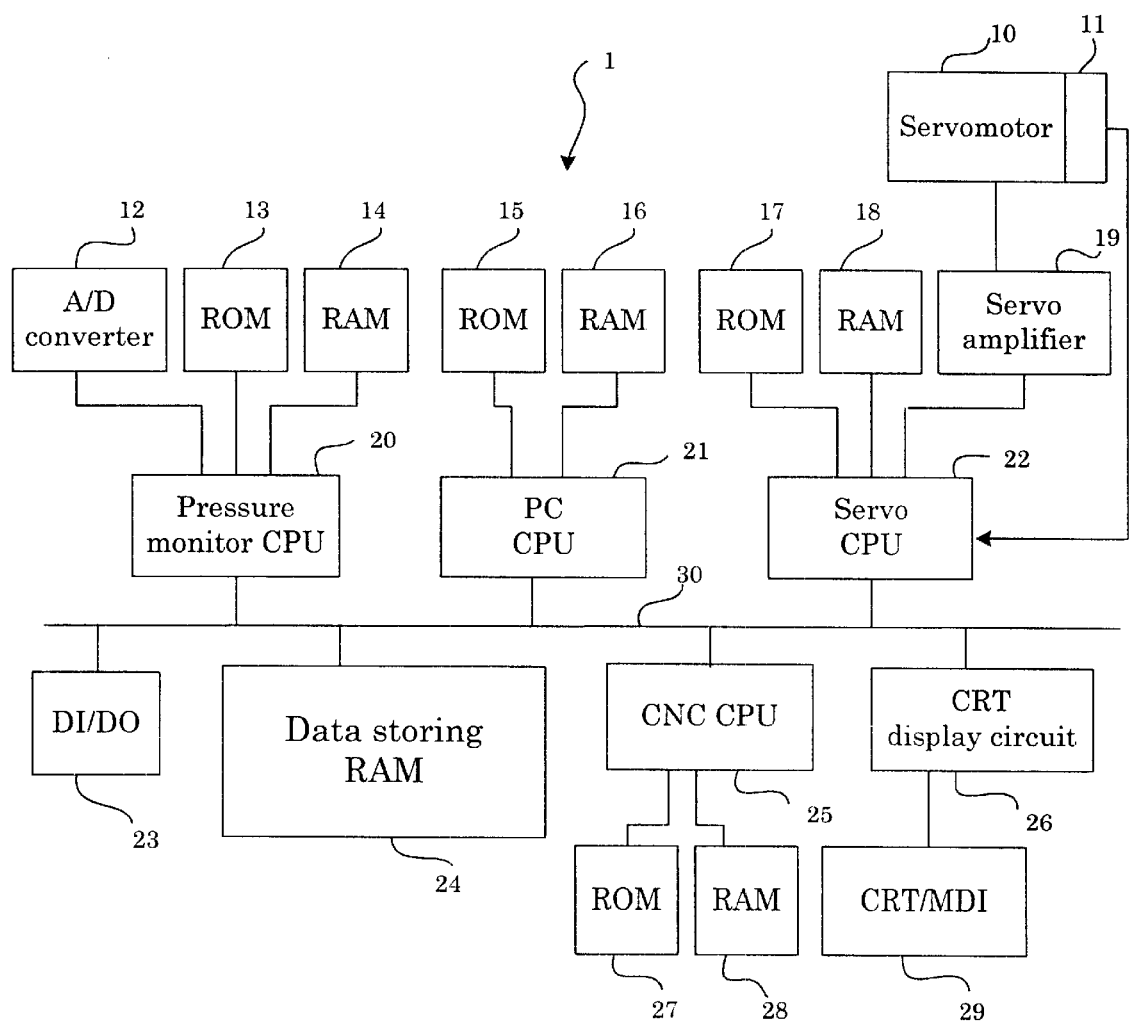
FIG. 1 is a block diagram of the main part of a controller of an injection molding machine configuring an ejector controller of one embodiment of the present invention.

FIG. 1 is a block diagram of one embodiment of a controller 1 of an injection molding machine which also configures an ejector controller of the present invention.

The controller 1 has a CNC-CPU 25 which is a microprocessor for numerical control, a PC-CPU 21 which is a microprocessor for a programmable controller, a servo CPU 22 which is a microprocessor for servo control, and a pressure monitor CPU 20 which performs the sampling processing of the signals from sensors provided on the injection molding machine main body side to detect various pressures such as the injection pressure through an A/D converter 12 and which stores the signals into a RAM 14, and it can perform the information transmission between the respective microprocessors by selecting the mutual input and output through a bus 30.

To the PC-CPU 21, a ROM 15 which stores a sequence program or the like for controlling the sequential operation of the injection molding machine, and a RAM 16 which is used for the temporary storage of the arithmetic data or the like are connected, and to the CNC-CPU 25, a ROM 27 which stores the automatic operation program for controlling throughout the injection molding machine or the like, and a RAM 28 which is used for the temporary storage of the arithmetic data or the like are connected.

Furthermore, to the servo CPU 22, a ROM 17 which stores the control program exclusively used for the servo control for performing the processing of a position loop, a speed loop, and a current loop, and a RAM 18 which is used for the temporary storage of the data are connected.

To the pressure monitor CPU 20, a ROM 13 which stores the control program of the control performed by the above described pressure monitor CPU 20, and the above described RAM 14 which stores the pressure detected by various sensors or the like are connected.

Furthermore, to the servo CPU 22, a servo amplifier 19 is connected, which drives the servo motor 10 of individual axes for the die clamping, injection, screw rotation, ejector, or the like on the basis of the command from the above described CPU 22, and the output from a position and speed detector 11 attached to the servomotor 10 of individual axes is returned to the servo CPU 22.

The present position of individual axes is calculated by the servo CPU 22 on the basis of the feedback signal of the position from the position and speed detector 11, and it is renewed and stored in the present position storing register for individual axes.

FIG. 1 shows only the servomotor 10 which drives an ejector axis (ejector mechanism), and the position and speed detector 11 which is attached to the above described servomotor 10 to detect the position of an ejector pin or the like on the basis of the rotational position of the above described servomotor, and every configuration of individual axes for the clamping, injection, or the like is similar to this.

An interface 23 is an input and output interface which receives a signal from a limit switch or a control panel arranged at each part of the injection molding machine main body and which transmits various commands to peripheral installations of the injection molding machine or the like.

A manual data input device 29 with a display is connected to the bus 30 through a CRT display circuit 26, and it can perform selection of the graphic display screen or functional menu, and input operation of various data or the like, and it has numerical keys for the numerical data input and various function keys or the like. Herein, the display device may be a device using a liquid crystal.

A data storing RAM 24 configured by a nonvolatile memory is a memory for the molding data storage which stores the molding condition relating to the injection molding works and various set values, parameters, macro variables or the like. Furthermore, relating to the present invention, a table for storing the data of the estimated disturbance load torque values to be described later is provided in this data storing RAM 24.

According to the above described configuration, the PC-CPU 21 controls the sequential operation of the total of the injection molding machine, and the CNC-CPU 25 performs the distribution of the movement commands to the servomotor of individual axes on the basis of the operating program of the ROM 27, the molding conditions stored in the data storing RAM 24, or the like, and the servo CPU 22 performs servo controls such as position loop control, speed loop control, and further, current loop control similarly to the prior art on the basis of the movement commands distributed to individual axes and the feedback signals of the position and speed detected by the position and speed detector 11 or the like, and it performs the so-called digital servo processing.

The above described configuration is similar to that of the controller of a conventional electrically-powered injection molding machine, and the ejector controller of the present invention is configured by this controller 1. Then, it is different from the conventional controller in that in the data storing RAM 24 configured by a nonvolatile memory, tables TA, TB, TC, TD, TE are provided, which store the data of values of disturbance load torques estimated for each specific sampling period by the disturbance estimating observer, the average value thereof as the reference disturbance load torque, the upper limit value and lower limit value of the permissible range determined from the average value, and the deviation between the estimated disturbance load torque value and the average value, and that in the ROM 17 connected to the servo CPU 22, a program of the disturbance estimating observer which is assembled in the speed loop to estimate the disturbance torque applied to the servomotor 10, and a program of processing for detecting an abnormal load in the section of the ejector stroke on the basis of the estimated disturbance load torque determined by the processing of this disturbance estimating observer are stored.

Next, the abnormal load detection processing by using the ejector controller configured by this controller will be described together with reference to the flow chart of the abnormal load detection processing performed by the servo CPU 22 shown in FIG. 2 and FIG. 3.

Figure 5:
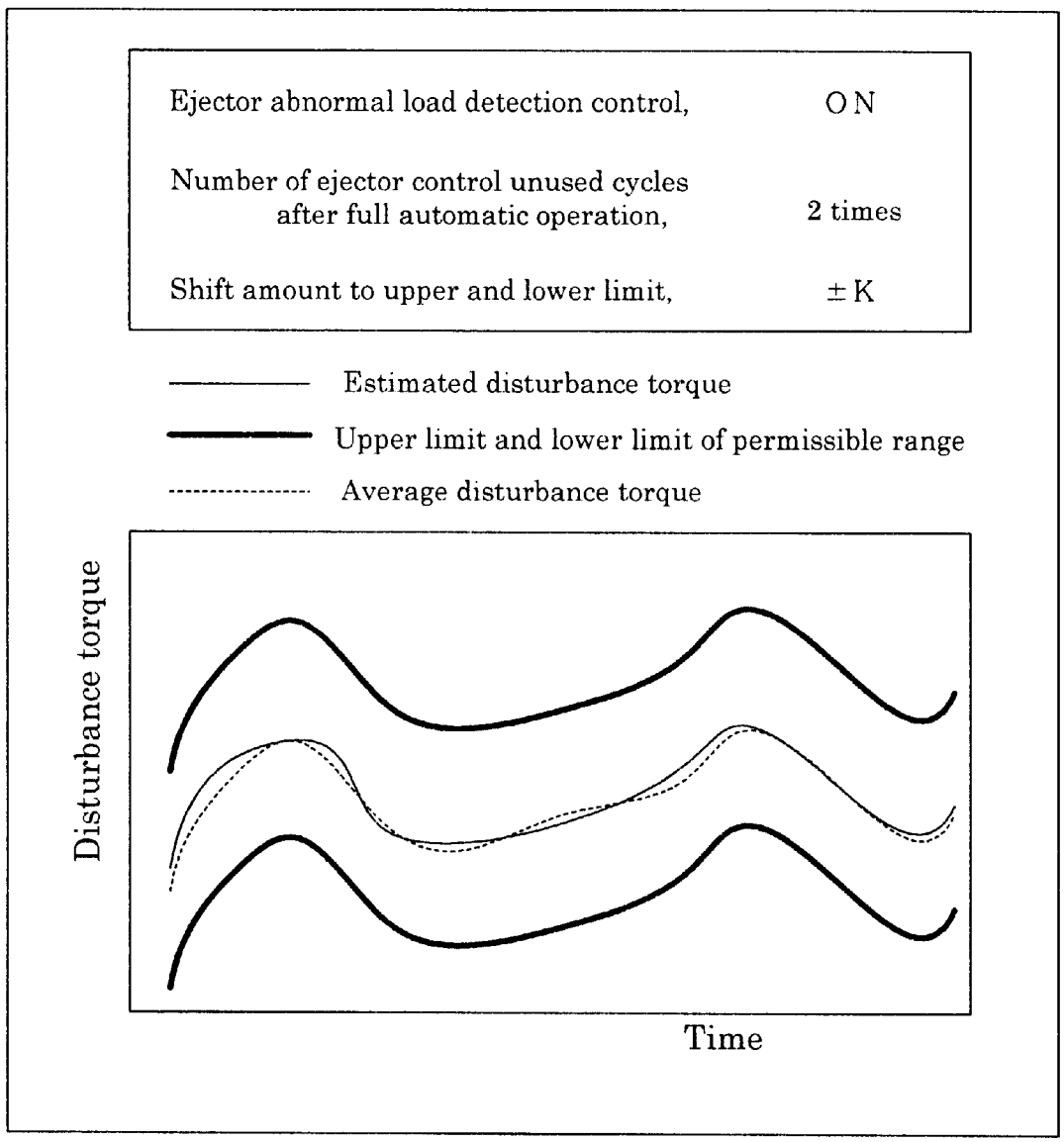
FIG. 5 is one example of a display screen of the ejector abnormal load detection control setting in a display device of the above described embodiment.

First, the condition for this ejector operation is set together with the molding condition. FIG. 5 is a figure showing the display screen of the abnormal load detection condition setting in the ejector operation accessed by operating the manual data input device 29 with a display.

Access to this display screen of the abnormal load detection condition setting is performed, and whether the detection control operation of an abnormal load applied to the ejector should be performed or not is set. FIG. 5 shows an example in which [ejector abnormal load detection control ON] is set so that the detection control operation of an abnormal load applied to the ejector may be performed.

Furthermore, in the case where [ejector abnormal load detection control ON] is set, the number T of cycles after the start of the automatic molding cycle in which the detection control operation of an abnormal load is not performed is set.

The reason of this is as follows: Just after the start of the automatic molding, the frictional force in the ejector pin or the like is not stabilized because of the change of temperature or the like, and as a result of that, the estimated disturbance load torque is also fluctuated, and therefore, in order to wait for the stabilization of the torque at the time when a normal ejector operation is performed, a number of cycles is set, by which the output torque of the servomotor 10 is stabilized. In the example of FIG. 5, [2 cycles] is set.

Furthermore, in the present invention, the average value of the estimated disturbance load torques estimated by the disturbance estimating observer is the reference disturbance load torque, and shift amounts ±K are set, which are added to this reference disturbance load torque so that the upper limit value and lower limit value of the permissible range may be determined.

Herein, in the embodiment shown in FIG. 5, ±K are set as shift amounts of the same amount for both the upper limit value and lower limit value, but the shift amounts for determining the upper limit value and lower limit value may be set at values different from each other. The upper limit value may be a suitable value within the range of giving no damage to the die. Furthermore, the lower limit value is a value for detecting charging failure of resin or the like, and an optimum shift amount for this detection may be set. Herein, at first, a proper shift amount is set in advance. Then, as described later, when the fully automatic molding is performed, the average (waveform) of the estimated disturbance load torques at the time of the ejector operation is determined as the reference disturbance load torque, and therefore, this average is displayed by a graph as shown in FIG. 5, and on the basis of this average waveform, the shift amount +K of the upper limit value is set so that it may be the maximum value of the permissible range of giving no damage to the die, while the shift amount −K is set so that it may be a value smaller than the average as this reference disturbance load torque but a little larger than the load torque during an ejector operation with no molded product.

Figure 2:
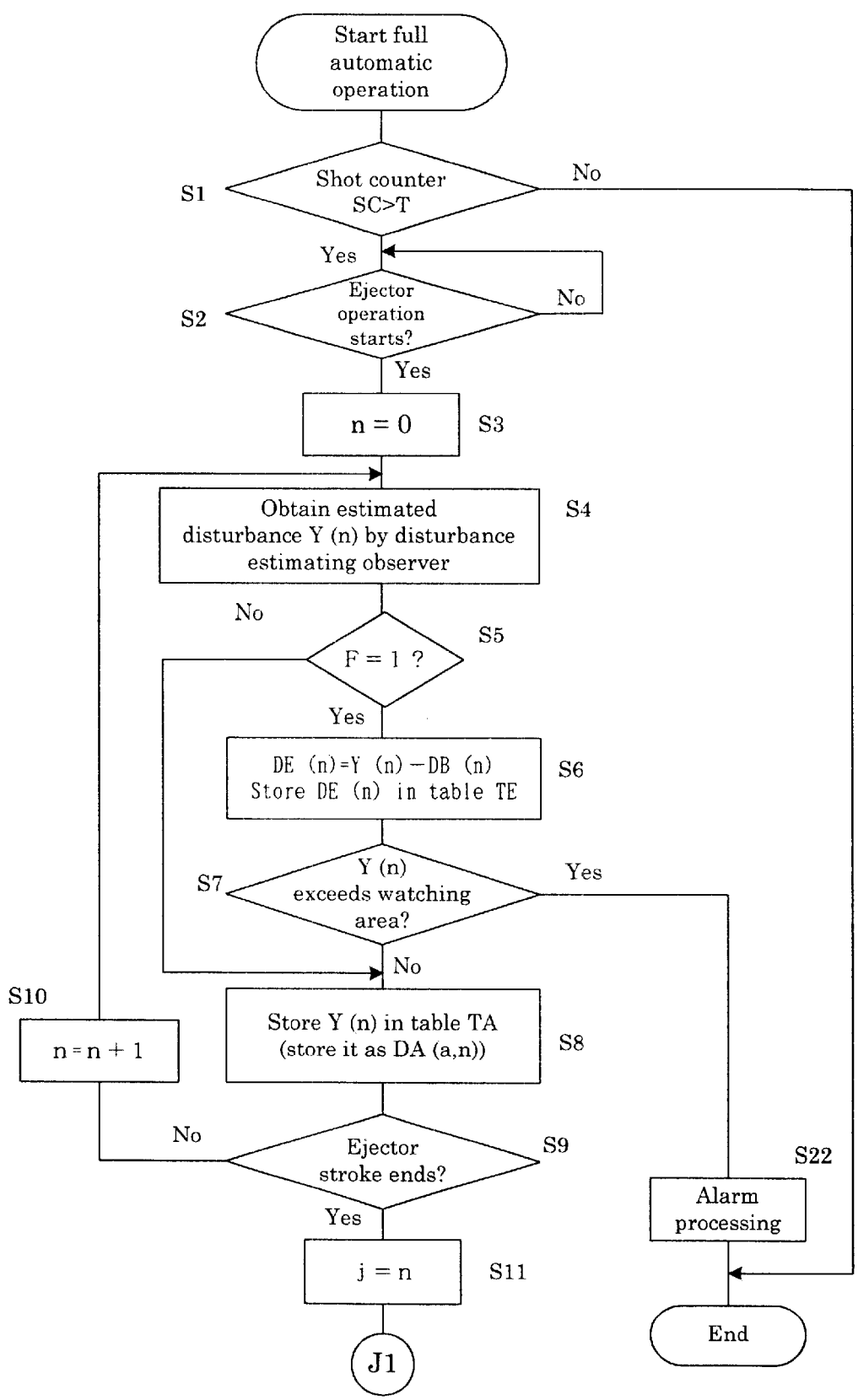
FIG. 2 is a flow chart of the processing of the ejector abnormal load detection control in the above described embodiment.
Figure 3:
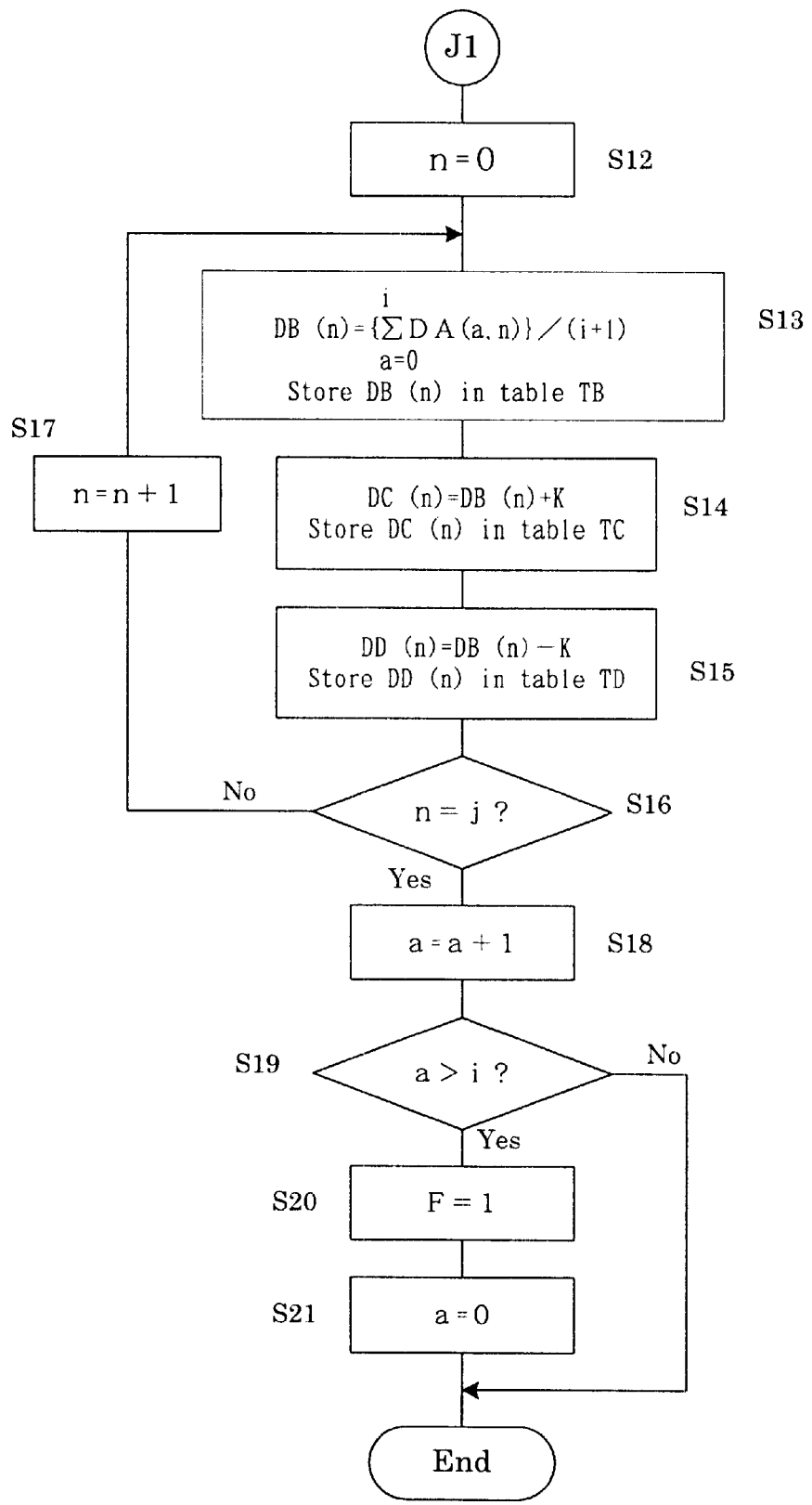
FIG. 3 is a flow chart following that in FIG. 2.

Then, when the full automatic molding cycle is started, the servo CPU 22 starts the processing shown by the flow chart in FIG. 2 and FIG. 3. Herein, in the initial setting at the time when the automatic molding cycle is instructed, the servo CPU 22 sets a shot counter SC for counting the number of injections to be described later at [1], and sets a pointer a, which shows the storing position of the table TA, which is provided in the data storing RAM 24 for storing the data DA of the estimated disturbance load torque in the sampling period in the stroke section of the ejector operation, at [0], and sets a flag F at [0]. Furthermore, in tables TA, TB, TC, TD, TE for storing the estimated disturbance load torque or the like, all stored data are also cleared.

First, the servo CPU 22 judges whether the shot counter SC exceeds the set number T of cycles at which the ejector abnormal load detection control is not performed (step S1), and when not exceeding, the above described processing of the ejector abnormal load detection control finishes. Herein, the shot counter SC is increased by [1] each time one molding cycle finishes, and it is increased in the processing period other than this processing of the ejector abnormal load detection control.

After that, waiting is continued until the shot counter SC exceeds the set number T of cycles, and after it has exceeded this set number T of cycles so that the ejector operation may be considered to have been stabilized, the procedure proceeds to step S2 from step S1, and whether the ejector operation is started or not is judged. This judgment is similar to that of the prior art, and it is made on the basis of the position of a movable die or the like.

When the start of the ejector operation is detected, an index n of sampling is set at [0] (step S3), and the estimated disturbance load torque Y(n) estimated by the processing of the disturbance estimating observer which is assembled in the speed loop and is performed together with the speed loop processing is read (step S4). Herein, since the processing of this disturbance estimating observer has already been well known in Japanese Patent Laid-Open No. 10-119107 or the like, the concrete processing will be omitted.

Next, whether the flag F is set at [1] or not is judged (step S5), and when not at [1], the procedure proceeds to step S8. This flag F is set at [1] when all data for obtaining the average value as the reference disturbance load torque are obtained as described later, and at the beginning, it is set at [0] since all data for obtaining the average of the set numbers of times of the ejector operation are not obtained, and the procedure proceeds to step S8. At step S8, the determined estimated disturbance load torque Y(n) is stored in the table TA as the data DA(a, n). That is, the determined estimated disturbance load torque Y(n) is stored as the data DA(a, n) in the address corresponding to the indexes a, n of the table TA on the basis of the index a which shows the number of ejector operations (molding cycles), and the index n which shows the number of samplings in that ejector operations.

Then, whether the ejector is at stroke end or not is judged (step S9), and when the ejector is not at stroke end, the index n is increased by [1] (step S10), and the step returns to step S4. Herein, this judgment of whether the ejector is at stroke end or not is made on the basis of the position of the servomotor 10 which is detected by the position and speed detector 11 attached to the servomotor for driving the ejector axis and which is stored in the present position storing register. The ejector mechanism is a mechanism in which the rotation of the servomotor is changed to the linear movement by using a mechanism for converting the rotational movement of a ball screw or the like into the linear movement so that the ejector pin or the like may linearly be moved, and there is a one-to-one relation between the rotation of the servomotor and the projecting position of the ejector pin, and when the rotational position of the servomotor is known, the projecting position of the ejector pin can be known.

Then, the processing at steps S4, S5, S8, S9 and S10 is repeatedly performed for each specific sampling period (for each speed loop processing period), and when the ejector is at stroke end, the procedure proceeds to step S11 from step S9, and the value of the index n is stored in the register as the sampling total number j of projecting strokes in the ejector operations.

Thus, the estimated disturbance load torque Y (n) at the time of the ejector operation determined by the disturbance estimating observer is stored in the table TA as the data DA (a, n). At first, a=0 is made, and therefore, the data DA (0, 0) to DA (0, j) are stored in the table TA shown in FIG. 4.

Next, the index n is cleared to [0] again (step S12), and the processing at steps S13, S14 and S15 is performed for obtaining the average value DB (n) of the estimated disturbance load torques as the reference disturbance load torque, and the upper limit value DC (n) and lower limit value DD (n) of the permissible range.

That is, the data of the estimated disturbance values in the ejector operations (molding cycles) 0 to i, at the n-th sampling time, which are stored in the table TA, are added, and the added data are divided by the number (i+1) of ejector operations (molding cycles) so that the average value DB (n) may be obtained, and the obtained DB (n) is stored in the table TB as shown in FIG. 4 (step S13).

Furthermore, the set shift amount +K is added to this average value DB (n) so that the upper limit value DC (n) of the permissible range may be obtained, and the obtained DC (n) is stored in the table TC as shown in FIG. 4 (step S14). Furthermore, the set shift amount −K is added to this average value DB (n) so that the lower limit value DD (n) of the permissible range may be determined, and the obtained DD (n) is stored in the table TD as shown in FIG. 4 (step S15).

Then, until the index n becomes the sampling total number j (step S17), the index n is increased by [1] (step S17) and in the meantime, the above described averaging processing (step S13) and the processing for determining the upper limit value and lower limit value of the permissible range (steps S14, S15) are performed.

Herein, at first, all data are not stored in the table TA, and therefore, for the average value DB (n), the upper limit value DC (n) and the lower limit value DD (n) to be determined at the steps S13, S14 and S15, accurate data cannot be obtained, and this situation continues until the data of the total number (i+1) of ejector operations (molding cycles) are. obtained to fill the table TA. After that situation is completed, accurate data can be obtained.

When the index n reaches the total number j of samplings, the procedure proceeds to step S18 from step S16, and the index a is increased by [1], and whether the above described index a exceeds the value of the final address i corresponding to the number of ejector operations (molding cycles) stored in the table TA or not is judged (step S19). That is, whether the data of the estimated disturbance load torque have been written in the final address i of the table TA by the above described ejector operation or not is judged. When the value of the index a has not exceeded the value of the final address i, the abnormal detection processing in the above described ejector operation finishes.

Then, each time the molding cycle is started, the repeated processing at steps S1 to S3 and steps S4, S5, S8, S9 and S10, the repeated processing at steps S11 and S12 and steps S13 to S17, and the processing at steps S18 and S19 are performed, and when the index a is set at [i], at that moment, at step S8, the estimated disturbance load torque Y (n) is written in the column of the address i of the table TA as the data DA (i, 0) to DA (i, j). Furthermore, since all data corresponding to the number (i+1) of ejector operations (molding cycles) to be stored in the table TA have been stored in the table TA, the average value DB (n), and the upper limit value DC (n) and lower limit value DD (n) of the permissible range which are determined by the processing at steps S13 to S16 can be accurate values.

That is, by the processing at step S13, the average value DB (n) is determined as follows:

$$DB(0)=\{DA(0, 0)+DA(1, 0)+ \ldots +DA(i, 0)\}/(i+1)$$

$$DB(1)=\{DA(0, 1)+DA(1, 1)+ \ldots +DA(i, 1)\}/(i+1)$$

$$DB(n)=\{DA(0, n)+DA(1, n)+ \ldots +DA(i, n)\}/(i+1)$$

$$DB(j)=\{DA(0, j)+DA(1, j)+ \ldots +DA(i, j)\}/(i+1)$$

Furthermore, at step S14 and step S15, the upper limit value and lower limit value of the permissible range are determined by adding shift amounts +K, −K to each of the determined average values DB (0) to DB (j).

Then, at step S18, the index a is increased, and when the value of the above described index a exceeds the value of i, the procedure proceeds to step S20 from step S19, and the flag F is set at [1], and the index a is cleared to [0] (step S20).

That is, when the data are stored up to the final address i where the data of the ejector operation process of the table TA are stored, the step returns to the beginning at the time of the ejector operation of the next molding cycle, and the index a is cleared to [0] so that the data may be stored again from the address [0]. As a result of that, in the table TA, (i+1) pieces of data of the ejector operations of the latest molding cycles before (prior to) the ejector operation of the present molding cycle are stored at all times.

Then, from the ejector operation process of the next molding cycle, the flag F is set at [1], and therefore, the procedure proceeds to step S6 from step S5, and the average value DB (n) stored in the table TB is subtracted from the estimated disturbance load torque Y (n) obtained by the disturbance estimating observer so that the deviation DE (n) between the determined estimated disturbance load torque Y (n) and the average value DB (n) may be obtained, and the obtained DE (n) is stored in the table TE as shown in FIG. 4.

Then, whether or not the estimated disturbance load torque Y (n) is out of the permissible range, having exceeded the upper limit value DC (n) or lower limit value DD (n) of the permissible range stored in tables TC, TD is judged (step S7), and when it is within the permissible range, the procedure proceeds to step S8, and when it is out of the permissible range, the procedure proceeds to step S22, and a load abnormal signal indicating the fact that a load out of the permissible range has been applied to the ejector axis is outputted, and an alarm processing for stopping the operation of the servomotor 10 or the like is performed, and the abnormal load detection processing of this ejector operation finishes.

Thus, the average value as the reference disturbance load torque is obtained by the estimated disturbance load torques at the time of the ejector operations in the latest (i+1) molding cycles, and both the upper limit value and lower limit value of the permissible range shifts in association with this average value, and whether it is within the range between the lower limit value (waveform) smaller than the average value by the set shift amount K and the upper limit value (waveform) larger by the set value K or not is judged at all times, and therefore, even when the average value is fluctuated depending on the change of temperature or the like, an optimum permissible range can be maintained. Furthermore, even when the die is exchanged, the upper limit value and lower limit value of the permissible range, that is, the permissible range for judging an abnormal load at the time of the ejector operation is automatically determined by the average value of the estimated disturbance load torques at the time of the normal ejector operation, and an abnormal is judged by this determined permissible range, and therefore, it is unnecessary to set the permissible range for judging this abnormal load by experience and perception similarly to the prior art, and at any time, an optimum permissible range can automatically be set.

Herein, at the time when the die is exchanged or the like, at first, whether there is an error in the setting of the projecting amount of the ejector pin or not is watched, and in the meantime, at least, it is necessary to gather the data of the number (i+1) of molding cycles to be stored in the table TA. Once the data DA (0, 0) to DA (i, j) of the estimated disturbance load torques in (i+1) normal ejector operations have been obtained, as shown in FIG. 2, the estimated disturbance load torque Y (n) is not stored any more in the table TA whenever it exceeds the upper limit value DC (n) or lower limit value DD (n) of the permissible range. That is, only the estimated disturbance load torque Y (n) at the time of the normal ejector operation is stored in the table TA, and therefore, the average is determined by the data stored in this table TA, and the upper limit value and lower limit value of the permissible range are determined, and consequently, at all times, an accurate permissible range can be determined.

Furthermore, by operating a function key (soft key) provided on the manual data input device 29 with a display, the waveform of the estimated disturbance load torque at the time of the latest ejector operation, stored in the table TA, and the related data stored in tables TB, TC, TD, TE can be displayed by graphs on the CRT screen as the display screen as shown in FIG. 5. Herein, FIG. 5 shows an example of displaying of the waveform of the estimated disturbance load torque at the time of the latest ejector operation, stored in the table TA, the waveform of the average value of the reference disturbance load torque stored in the table TB, and the waveforms of the upper limit value and lower limit value of the permissible rage stored in the tables TC and TD respectively.

Thus, since the waveform of the average value and the waveforms of the upper limit value and lower limit value of the permissible range are displayed, the operator can reset the shift amounts, +K, −K, for determining the upper limit value and lower limit value of the permissible range to optimum values by referring to these displayed waveforms.

It is also possible to display the data to be stored in the table TE by a graph, instead of or in addition to displaying of the waveform of the estimated disturbance load torque at the time of the latest ejector operation on the basis of the data stored in the table TA. Since this data to be stored in the table TE stores the deviation between the average value as the reference disturbance load torque and the estimated disturbance load torque at the time of the latest ejector operation, the waveform showing a deviation from the average value is displayed, so that the divergence from the average value can directly be seen, and there is such an effect that the present situation can be grasped more clearly.

Furthermore, in the present invention, instead of applying a constant value uniformly to the entire range of the stroke of the ejector operation as the standard for discriminating an abnormal load, the upper limit value and lower limit value of the permissible range which give a standard for discriminating an abnormal load may be changed according to the position of the ejector pin in the stroke, so that an abnormal load can be discriminated more accurately. For example, when one set value is applied uniformly to the entire range of the stroke of the ejector operation, this set value may be too large in a certain position, so that a problem of being unable to detect an abnormal load though the abnormal load occurs may be caused, and on the contrary, when the set value is too small, at a certain position, a phenomenon of determination of an abnormal load in spite of a normal ejector operation may be produced.

On the contrary, in the present invention, the permissible range which gives a standard for discriminating an abnormal load is changed according to the position of the ejector pin in the stroke of the ejector operation, and therefore, an abnormal load can be detected more accurately than that in the case of using a constant value as the standard of discrimination, so that the die can accurately be protected.

In the above described embodiment, the graphic display of the latest estimated disturbance load torque, the average value, the upper limit value and lower limit value of the permissible range, or the like are shown as a function of time. However, these can be shown as a function of the position of the ejector pin or the rotational position of the servomotor for driving the ejector axis. That is, there is a one-to-one correlation between the rotational position of the servomotor 10 detected by the position and speed detector 11 attached to the servomotor 10 and the position of the ejector pin driven by the above described servomotor 10, and therefore, it is also possible to perform the graphic display of the average value of the above described reference disturbance load torque, the upper limit value of the permissible range, or the like as a function of the rotational position of the servomotor 10 detected by this position and speed detector 11. In this case, it is sufficient that the estimated disturbance load torque obtained by the disturbance estimating observer is stored each time the servomotor 10 moves through a specific amount, and on the basis of this stored data, the average value and the upper limit value and lower limit value of the permissible range are determined and graphically displayed on the screen. Furthermore, it is also possible to perform the judgment of whether it is an abnormal load or not with respect to this position.

Furthermore, the gathering of the estimated disturbance load torques is performed for each specific period in a way similar to that of this embodiment, and the rotational position of the servomotor 10 at that moment is stored, and on the basis of this position, the estimated disturbance load torque is displayed on the screen. Furthermore, the average value of the estimated disturbance torques may be obtained from the estimated disturbance torques to be obtained at specific positions, which are given by the interpolation of the estimated disturbance torques actually obtained at any positions, or which are given by the estimated disturbance torques actually obtained at any positions nearest to the specific positions. Then, the obtained average value may be graphically displayed on a screen.

In the embodiment described above, the permissible upper and lower limits are determined from the average of the data of disturbance load torques which were obtained by performing a plurality of ejector operations (i□0; i□1). But, in place of the above described embodiment, only the data of the disturbance load torque which were obtained by performing only one latest ejector operation (i=0) may be stored in the table TA (a row of i=0). In this case, the content of the reference disturbance load torque to be stored in the table TB is the same as that to be stored in the table TA.

What is claimed is:

1. An ejector controller of an injection molding machine which drives and controls a servomotor to drive an ejector axis, comprising:

load detecting means for detecting a load applied to said servomotor;

means for detecting the load applied to the servomotor at the time of ejector operation for each molding cycle by means of said load detecting means, and means for storing the load with respect to the ejector operation time or ejector position for the latest one or a plurality of ejector operations before the present molding cycle;

means for obtaining a reference load by computing an average of loads stored in the storing means;

means for determining a permissible upper limit value from the reference load; and discriminating means for outputting an abnormal signal when the load at the time of the present ejector operation has exceeded said permissible upper limit value.

2. The ejector controller of an injection molding machine according to claim 1, wherein, when the abnormal signal is outputted, the load applied to the servomotor at the time of that ejector operation is excluded from the data for determining the reference load.

3. The ejector controller of an injection molding machine according to claim 1, wherein:

said permissible upper limit value is set on a screen; and the load applied to the servomotor at the time of the present ejector operation, the reference load and the permissible upper limit value, or a deviation between the reference load and the load at the time of the present ejector operation and the permissible upper limit value are graphically displayed on the screen with respect to the time or ejector position.

4. The ejector controller of an injection molding machine according to claim 1, wherein:

said means for determining a permissible upper limit value also determines a permissible lower limit value from said reference load; and said discriminating means also outputs the abnormal signal when the load applied to the servomotor has fallen below said permissible lower limit value.

5. The ejector controller of an injection molding machine according to claim 1, wherein the load applied to the servomotor for the predetermined number of cycles after starting of a full automatic molding is excluded from the data for determining the reference load.

6. The ejector controller of an injection molding machine according to claim 5, wherein said predetermined number of cycles after starting of a full automatic molding for which the load applied to the servomotor is excluded from data for determining the reference load is set on a screen of display means.

7. The ejector controller of an injection molding machine according to claim 1, wherein said reference load is determined by the average value of the loads applied to the servomotor at the time of ejector operations in a plurality of molding cycles before the present molding cycle.

8. The ejector controller of an injection molding machine according to claim 1, wherein said load detecting means for detecting a load applied to said servomotor is a disturbance estimating observer which estimates a load torque.

9. An ejector controller of an injection molding machine which drives and controls a servomotor to drive an ejector axis, comprising:

a load detector detecting a load applied to the servomotor at a time of ejector operation for each molding cycle, and a storage unit storing the load with respect to the ejector operation time or ejector position for the latest one or a plurality of ejector operations before the present molding cycle;

a reference unit obtaining a reference load by computing an average of loads stored in the storage unit;

a determining unit determining a permissible upper limit value from the reference load; and a discriminating unit outputting an abnormal signal when the load at the time of the present ejector operation has exceeded said permissible upper limit value.

10. The ejector controller of an injection molding machine according to claim 9, wherein, when the abnormal signal is outputted, the load applied to the servomotor at the time of that ejector operation is excluded from the data for determining the reference load.

11. The ejector controller of an injection molding machine according to claim 9, wherein:

said permissible upper limit value is set on a screen; and the load applied to the servomotor at the time of the present ejector operation, the reference load and the permissible upper limit value, or a deviation between the reference load and the load at the time of the present ejector operation and the permissible upper limit value are graphically displayed on the screen with respect to the time or ejector position.

12. The ejector controller of an injection molding machine according to claim 9, wherein:

said determining unit determining a permissible upper limit value also determines a permissible lower limit value from said reference load; and said discriminating unit also outputs the abnormal signal when the load applied to the servomotor has fallen below said permissible lower limit value.

13. The ejector controller of an injection molding machine according to claim 9, wherein the load applied to the servomotor for the predetermined number of cycles after starting of a full automatic molding is excluded from the data for determining the reference load.

14. The ejector controller of an injection molding machine according to claim 13, wherein said predetermined number of cycles after starting of a full automatic molding for which the load applied to the servomotor is excluded from data for determining the reference load is set on a display.

15. The ejector controller of an injection molding machine according to claim 9, wherein said reference load is determined by the average value of the loads applied to the servomotor at the time of ejector operations in a plurality of molding cycles before the present molding cycle.

16. The ejector controller of an injection molding machine according to claim 9, wherein said load detector is a disturbance estimating observer which estimates a load torque.

* * * * *